US012169060B1

(12) United States Patent
Jiang et al.

(10) Patent No.: US 12,169,060 B1
(45) Date of Patent: Dec. 17, 2024

(54) FLEXIBLE CIRCUIT BOARD BASED LIGHTING ELEMENT DRIVER FOR AN AUTOMOTIVE LIGHTING SYSTEM

(71) Applicant: STMicroelectronics International N.V., Geneva (CH)

(72) Inventors: Jiongdi Jiang, Shanghai (CN); Hui Yan, Shanghai (CN); Qiaoyong Liu, Shanghai (CN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 18/543,303

(22) Filed: Dec. 18, 2023

(51) Int. Cl.
*F21V 23/00* (2015.01)
*F21V 19/00* (2006.01)
*F21Y 115/10* (2016.01)

(52) U.S. Cl.
CPC .......... *F21V 23/005* (2013.01); *F21V 19/001* (2013.01); *F21Y 2115/10* (2016.08)

(58) Field of Classification Search
CPC .... F21V 23/005; F21V 19/001; F21V 23/004; F21V 23/003; F21V 23/006; F21Y 2115/10; H05B 47/10; H05B 47/105; H05B 45/30; H05B 45/00
See application file for complete search history.

(56) References Cited

U.S. PATENT DOCUMENTS

| | | | | |
|---|---|---|---|---|
| 2007/0182677 | A1 | 8/2007 | Lee et al. | |
| 2017/0079120 | A1 | 3/2017 | Lesaffre et al. | |
| 2018/0283672 | A1 | 10/2018 | Lehman | |
| 2020/0341188 | A1 | 10/2020 | Diana et al. | |
| 2022/0061152 | A1 | 2/2022 | Van Der Wel | |
| 2022/0105862 | A1* | 4/2022 | Unterweger | B60Q 11/005 |
| 2022/0227286 | A1* | 7/2022 | Bonart | B60Q 1/08 |
| 2022/0330400 | A1* | 10/2022 | Unterweger | H05B 45/30 |

* cited by examiner

*Primary Examiner* — Bao Q Truong
(74) *Attorney, Agent, or Firm* — Alston & Bird LLP

(57) ABSTRACT

An example apparatus, an automotive lighting system, and an automotive lighting apparatus for driving a lighting element in an automotive lighting system are provided. The example apparatus includes a lighting element and a lighting element driver electrically connected to the lighting element and a serial communication bus. The lighting element driver includes a flexible circuit board, a serial communication interface configured to receive a serial communication message related to the lighting element, a power supply interface electrically connected to a power source, and a lighting element driver processor mounted on and electrically connected to the flexible circuit board. The lighting element driver transmits power from the power supply interface to the lighting element based at least in part on the serial communication message.

20 Claims, 6 Drawing Sheets

FLEXIBLE CIRCUIT BOARD BASED LIGHTING ELEMENT DRIVER FOR AN AUTOMOTIVE LIGHTING SYSTEM

TECHNOLOGICAL FIELD

Embodiments of the present disclosure relate generally to a lighting element driver for an automotive lighting system, and more particularly, to a lighting element driver disposed on a flexible circuit board.

BACKGROUND

In recent years, automotive manufacturers have begun to move away from centralized drivers and large control modules in automotive lighting systems, to distributed drivers and small control modules. Distributed drivers enable a number of benefits when it comes to automotive lighting. For example, distributed drivers and controls require less wires. The reduction in wires may lead to reduced costs, and a reduction in space dedicated to the lighting system. In addition, distributed drivers and controls enable dynamic control of the lighting elements.

Applicant has identified many technical challenges and difficulties associated with distributed drivers in automotive lighting systems. Through applied effort, ingenuity, and innovation, Applicant has solved problems related to the architecture and design of lighting element drivers in automotive lighting systems by developing solutions embodied in the present disclosure, which are described in detail below.

BRIEF SUMMARY

Various embodiments are directed to an example apparatus, an automotive lighting system, and an automotive lighting apparatus for driving a lighting element in an automotive lighting system. An example apparatus is provided. In some embodiments the example apparatus comprises a lighting element and a lighting element driver electrically connected to the lighting element and a serial communication bus. The lighting element driver comprising a flexible circuit board, a serial communication interface configured to receive a serial communication message related to the lighting element, a power supply interface electrically connected to a power source, and a lighting element driver processor mounted on and electrically connected to the flexible circuit board. The lighting element driver transmits power from the power supply interface to the lighting element based at least in part on the serial communication message.

In some embodiments, the apparatus further comprises a rigid structure attached to a portion of the flexible circuit board, wherein the lighting element driver processor is mounted on a first surface of the flexible circuit board, and wherein the rigid structure is mounted on a second surface of the flexible circuit board opposite the first surface.

In some embodiments, the rigid structure has a thermal conductivity greater than 20 watts per meter-kelvin.

In some embodiments, the rigid structure comprises steel.

In some embodiments, the apparatus further comprises an electrical connection port configured to receive an electrical connector.

In some embodiments, the electrical connection port is configured to connect to the serial communication bus and a power supply line providing power from the power source.

In some embodiments, the lighting element comprises a plurality of lighting segments.

In some embodiments, the lighting segments are individually enabled by the lighting element driver processor.

In some embodiments, the lighting element is a light emitting diode.

In some embodiments, the serial communication interface is configured to receive the serial communication message in accordance with a controller area network (CAN) serial communication protocol.

In some embodiments, the lighting element driver is manufactured in accordance with an automotive grade.

An automotive lighting system is further provided. In some embodiments, the example automotive lighting system comprises a central processor and a plurality of lighting apparatuses. In some embodiments, each lighting apparatus comprising a lighting element and a lighting element driver electrically connected to the lighting element and a serial communication bus. In some embodiments, the lighting element driver comprises a flexible circuit board, a serial communication interface configured to receive a serial communication message related to the lighting element, a power supply interface electrically connected to a power source, and a lighting element driver processor mounted on and electrically connected to the flexible circuit board. The lighting element driver transmits power from the power supply interface to one or more light segments of the lighting element based at least in part on the serial communication message.

In some embodiments, the plurality of lighting apparatuses are electrically connected in series.

In some embodiments, the automotive lighting system further comprises a rigid structure attached to a portion of the flexible circuit board, wherein the lighting element driver processor is mounted on a first surface of the flexible circuit board, and wherein the rigid structure is mounted on a second surface of the flexible circuit board opposite the first surface.

In some embodiments, the rigid structure comprises steel.

In some embodiments, the automotive lighting system further comprises an electrical connection port configured to receive an electrical connector, wherein the electrical connection port is configured to connect to the serial communication bus and a power supply line providing power from the power source.

In some embodiments, the lighting element is a light emitting diode.

In some embodiments, the serial communication interface is configured to receive the serial communication message in accordance with a controller area network (CAN) serial communication protocol.

An automotive lighting apparatus is further provided. In some embodiments, the automotive lighting apparatus comprises a lighting element, and a lighting element driver electrically connected to the lighting element and a serial communication bus. In some embodiments, the lighting element driver comprises a flexible circuit board, a serial communication interface mounted on and electrically connected to the flexible circuit board and configured to receive a serial communication message, and a lighting element driver processor mounted on and electrically connected to the flexible circuit board. In some embodiments, the lighting element driver enables one or more light segments of the lighting element based at least in part on the serial communication message. In some embodiments, the lighting element driver further includes a rigid structure attached to a portion of the flexible circuit board, wherein the lighting element driver processor is mounted on a first surface of the flexible circuit board, and wherein the rigid structure is mounted on a second surface of the flexible circuit board opposite the first surface.

In some embodiments, the automotive lighting apparatus further comprises an electrical connection port configured to receive an electrical connector, wherein the electrical connection port is configured to connect to the serial communication bus and a power supply line providing power from a power source.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
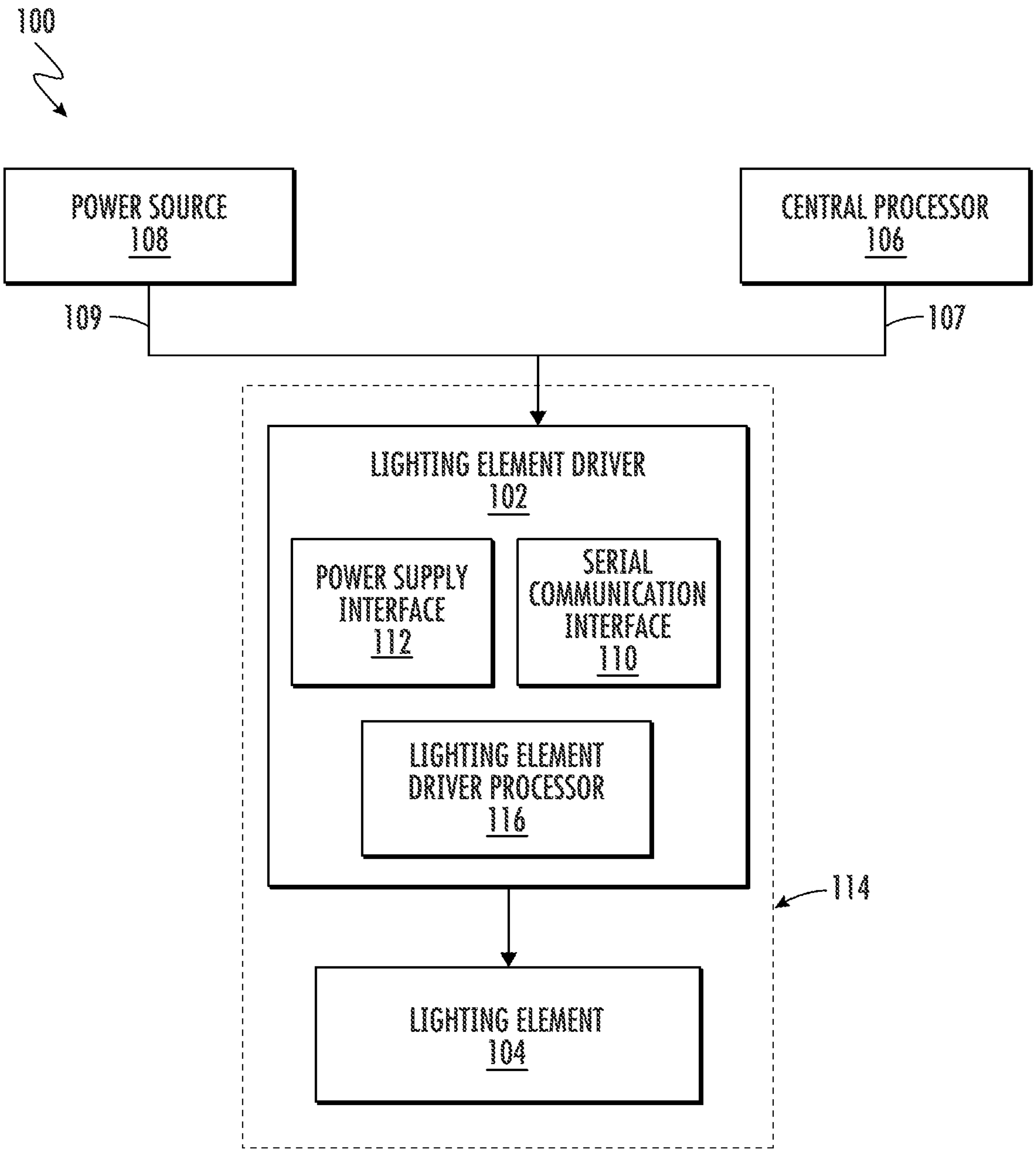
FIG. 1 illustrates an example block diagram of an automotive lighting system comprising an example automotive lighting apparatus in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

The various example embodiments described herein utilize various techniques to implement a lighting element driver on a flexible circuit board. The lighting element driver being configured to drive a lighting element as part of an automotive lighting system. Among other things, implementing the lighting element driver on a flexible circuit board reduces the size and cost of each lighting element driver. As understood by those of skill in the field to which the present disclosure pertains, there are numerous example scenarios in which reducing the size and the cost of lighting element drivers may be beneficial, especially in the context of a distributed architecture automotive lighting system.

In recent years, automotive manufacturers have begun to move away from automotive lighting systems having centralized drivers with large control modules, to distributed drivers and small control modules. Distributed drivers enable a number of benefits when it comes to automotive lighting. For example, distributed drivers and controls require less wires. The reduction in wires may lead to reduced costs, and a reduction in space dedicated to the lighting system. In addition, distributed drivers and controls enable dynamic control of the lighting elements. Through firmware-over-the-air (FOTA) or other dynamic updates, greater control, including customization, of the individual lighting elements may be realized. In addition, standard protocols, such as controller area network flexible data rate (CAN FD) may be utilized, increasing the overall reliability of the automotive lighting system In some past examples, each lighting element in a distributed lighting automotive system has included an individual lighting element driver comprising a printed circuit board (PCB) and a flexible circuit board. The lighting element driver of prior automotive lighting modules comprise a printed circuit board electrically connected to a flexible circuit board with a PCB connector. In addition, the printed circuit board in some prior automotive lighting modules included a power connector configured to interface with an external power source and a separate serial connector configured to interface with a serial communication bus. Each connector of the power connector and the serial connector including individual attaching mechanisms, for example, an two electrical connectors, one configured to receive a power supply wire, and one configured to receive a serial communication bus wire. The printed circuit board of prior automotive lighting modules may further include a processor configured to manage the reception and transmission of power and serial communication messages between the automotive lighting module and the power supply line and/or serial communication bus wire. The printed circuit board may be electrically connected to the lighting element by a flexible wiring via a PCB connector facilitating the electrical connection between the printed circuit board and the flexible wiring.

In general, the printed circuit board of the prior example automotive lighting module comprises the primary electrical components enabling the functionality of the lighting element driver. For example, the printed circuit board comprises a serial communication interface configured to receive and respond to serial communication received at the serial connector. The printed circuit board of prior example automotive lighting modules may further include a power supply interface configured to receive and distribute power received from an external power source at the power connector. In addition, the printed circuit board of some prior example automotive lighting modules may include a processor configured to control power distribution to the lighting element through the PCB connector, and flexible wiring.

However, there are a number of drawbacks to prior example automotive lighting modules. For example, an automotive lighting module comprising a printed circuit board with associated connectors and a flexible circuit board may be bulky, occupying significant space. The amount of space occupied by an automotive lighting module may be especially problematic considering the confined space requirements of a lighting system in an automobile. In addition, the space occupied by an automotive lighting module may additionally be problematic in a distributed automotive lighting system in which each lighting element is attached to a lighting element driver.

In addition, prior example automotive lighting modules may include multiple various connectors necessary to provide electrical connections between the various components of the automotive lighting module. For example, the printed circuit board may include a power connector, a serial connector, and a PCB connector. Not only do these connectors add to the overall size of the automotive lighting module, such connectors may be expensive to manufacture. In addition, these additional connectors may reduce the overall reliability of the electrical connection, especially in a harsh environment, such as on an automobile.

The various example embodiments described herein provide a lighting apparatus in a distributed automotive lighting system, comprising a flexible circuit board configured to provide driving functionality to a lighting element, eliminating the need for a printed circuit board in the lighting apparatus. In general, a flexible circuit board is a circuit board that can twist, bend, fold, etc. The flexible circuit board generally consists of conductive traces laminated on a flexible polymer material. Flexible circuit boards may reduce the risk of wire connection failure in a harsh environment, such as an automotive environment. By implementing electrical components performing the primary functionality of the lighting element driver on the flexible circuit board, the need for a printed circuit board on a lighting element driver may be eliminated. Eliminating the printed circuit board portion of the lighting element driver reduces the size, complexity, and cost of the lighting element driver.

As a result of the herein described example embodiments and in some examples, the size, complexity, and cost of a lighting element driver in a distributed automotive lighting system may be greatly reduced. In addition, the reliability and security of the automotive lighting system may be increased.

Referring now to FIG. 1, an example automotive lighting system 100 is provided. As depicted in FIG. 1, the example automotive lighting system includes an automotive lighting apparatus 114 comprising a lighting element driver 102 and a lighting element 104, the lighting element driver 102 electrically connected to the lighting element 104. The lighting element driver 102 comprising at least a lighting element driver processor 116, a serial communication interface 110, and a power supply interface 112. As depicted in FIG. 1, the lighting element driver 102 is configured to receive serial communication messages from a central processor 106 over a serial communication bus 107. In addition, the lighting element driver 102 is configured to receive power from a power source 108 over a power supply line 109.

As depicted in FIG. 1, the example automotive lighting apparatus 114 of the example automotive lighting system 100 includes a lighting element driver 102. The lighting element driver 102 is any electrical component including hardware and/or software configured to receive power from a power supply line 109 and one or more serial communication messages from a serial communication bus 107 and supply power to the lighting element 104 based at least in part on the serial communication message.

As further depicted in FIG. 1, the example lighting element driver 102 includes a power supply interface 112. The power supply interface 112 is any circuitry including hardware and/or software configured to receive power from the power supply line 109 and condition the power for transmission to the lighting element 104. The power supply interface 112 includes pins, contact points, and/or electrical connectors configured to receive power from the power supply line 109. The power supply interface 112 may include electrical components to convert the power received from the power supply line 109 to power compatible with the lighting element 104. Power conversions techniques may include alternating current (AC) to direct current (DC) conversions, DC current and or voltage boosting or reduction, and so on. The power supply interface 112 may utilize electrical components such as buck converters, voltage regulators, diodes, DC/DC converters, transformers, and so on.

As further depicted in FIG. 1, the lighting element driver 102 includes a serial communication interface 110. The serial communication interface 110 is any circuitry including hardware and/or software configured to receive and decode serial communication messages from the serial communication bus 107. In some embodiments, the serial communication interface 110 may be further configured to transmit serial communication messages on the serial communication bus 107. The serial communication interface 110 may include pins, contact points, and/or electrical connectors to receive serial communication in accordance with a serial communication protocol. The serial communication interface 110 may further comprise electrical components to receive and decode the serial communication messages. Electrical components may include core circuitries related to sending and receiving serial communication messages on a serial communication bus including FIFOs, message buffers, other message handling hardware, logic gates, transistors, registers, look-up tables, flip-flops, and/or similar hardware components. The core circuitries related to sending and receiving serial communication messages may be designed and implemented as a field-programmable gate arrays (FPGA), application-specific integrated circuits (ASIC), or integrated circuits (IC).

In some embodiments, the serial communication interface 110 may be configured to send and receive serial communication messages according to a controller area network (CAN) protocol. CAN protocols may include Classic CAN, CAN FD, CAN-XL, and other derivations of the CAN protocol. A CAN protocol may enable communication among electrical components without a host processor. A CAN protocol may utilize unique identifiers for identifying the target of a distributed serial communication message. Thus, serial communication messages transmitted using the CAN protocol may be distributed to all components electrically connected to the serial communication bus 107. Only those components matching the transmission identifier may accept the serial communication message.

As further depicted in FIG. 1, the lighting element driver 102 includes a lighting element driver processor 116. The lighting element driver processor 116 is any processing device including hardware and/or software configured to receive serial communication messages and enable transmission to one or more lighting segments of a lighting element 104 based at least in part on the serial communication messages. In some embodiments, the lighting element driver processor 116 may include one or more processors, input/output circuitry, data storage media, communications circuitry, and other circuitry necessary to send and receive serial communication messages and carryout instructions based on the serial communication messages. The lighting element driver processor 116 may include connections to the power supply interface 112 or other components of the power system to control the current and/or voltage provided to the lighting element 104 and/or individual lighting segments of the lighting element 104. The lighting element driver processor 116 may be may be designed and implemented as a field-programmable gate arrays (FPGA), application-specific integrated circuits (ASIC), integrated circuits (IC), or any combination thereof.

In some embodiments, the lighting element driver processor 116 may be configured to receive firmware-over-the-air (FOTA) or other dynamic updates. Such dynamic updates may offer greater control, including customization of the lighting element driver 102 and associated lighting elements. For example, a lighting element driver 102 may be updated such that a customized pattern is displayed on the plurality of lighting elements 104 comprising the automotive lighting system 100. In another example, an update may be provided to control the brightness and/or dimming pattern of the lighting element 104.

In some embodiments, the lighting element driver 102 may include circuitry to control the brightness of the lighting element 104. The brightness of the lighting element 104 may be controlled by various electrical devices disposed within the power supply interface 112 or otherwise on the lighting element driver 102. For example, a pulse width modulator may be disposed on the lighting element driver 102. A lighting element driver processor 116 may be configured to control aspects of the pulse width modulator to adjust the brightness of the attached lighting element. 116. In some embodiments, the brightness of the lighting element 104 may be adjusted through serial communication messages received on the serial communication bus 107.

In some embodiments, the lighting element driver 102 may include circuitry to control the color of the lighting element 104. The color of the lighting element 104 may be controlled by altering the current, voltage, and/or pulse width of the signal provided to a variable-colored LED. For example, by configuring signals for a red channel, a green channel, and a blue channel separately, the color of the lighting element 104 or individual lighting segments of the lighting element 104 may be configured. In some embodiments, the color of the lighting element 104 may be adjusted through serial communication messages received on the serial communication bus 107.

Figure 2:
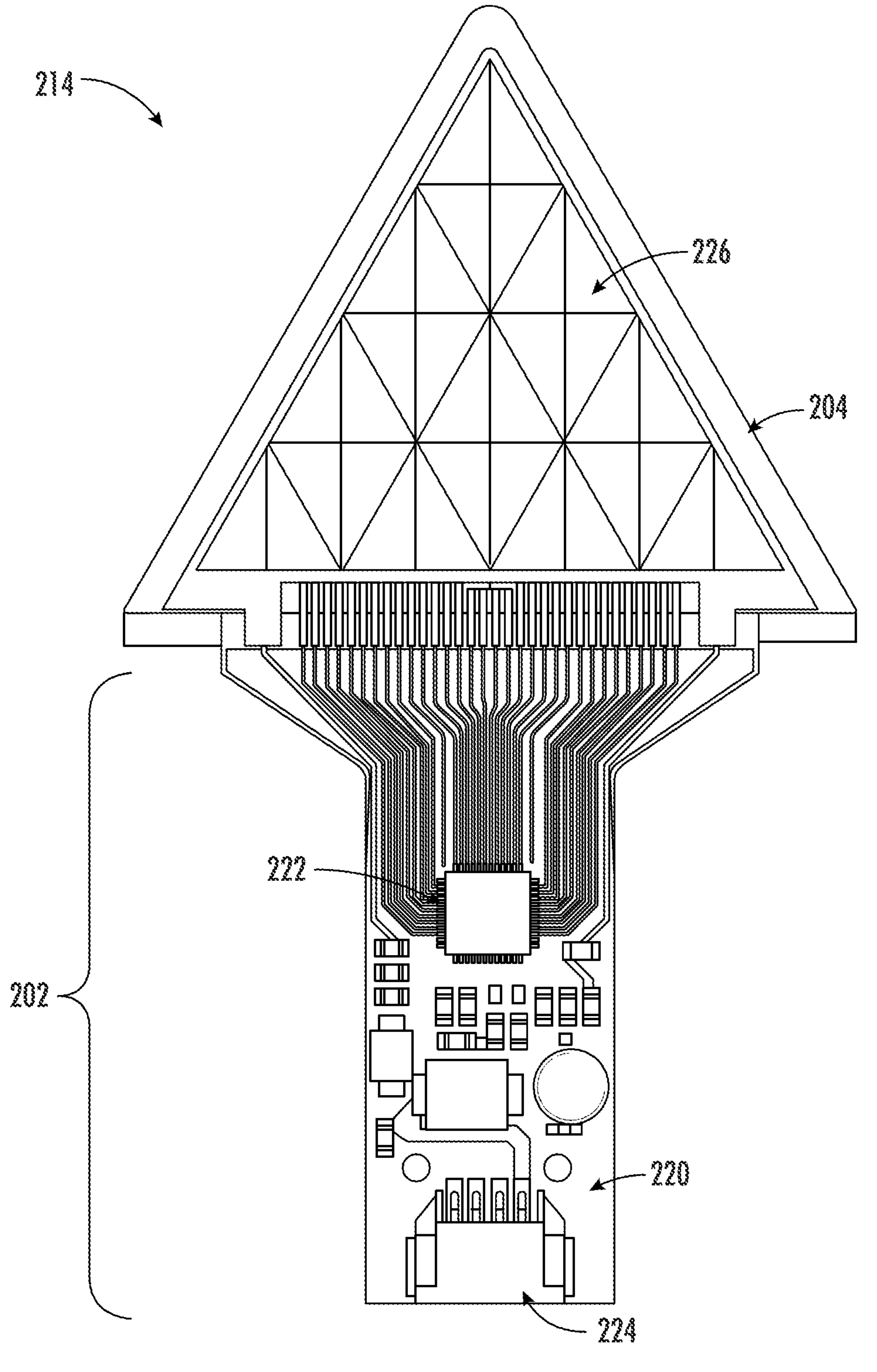
FIG. 2 illustrates a perspective view of an automotive lighting apparatus in accordance with an example embodiment of the present disclosure.

As further described in relation to FIG. 2, the lighting element driver 102 comprises a flexible circuit board.

As further depicted in FIG. 1, the example automotive lighting system 100 includes a power source 108 electrically connected to the lighting element driver 102 by a power supply line. The power source 108 is any source of electrical power, for example, a battery, generator, power supply, solar cell, or other source of electrical power. The power source 108 may be configured to transmit power along a power supply line 109. In some embodiments, the power source 108 may be configured to output direct current at a constant voltage, for example, the power source may generate a three volt direct current power supply and/or a five volt direct current power supply.

As further depicted in FIG. 1, the example automotive lighting system 100 includes a central processor 106 electrically connected to the lighting element driver 102 by a serial communication bus 107. The central processor 106 may include a serial communication interface 110 to transmit and receive serial communication messages to and from the automotive lighting apparatus 114 and other electronic devices connected to the serial communication bus 107. The central processor 106 is configured to transmit serial communication messages related to the operation of the lighting element 104. For example, the central processor 106 may transmit serial communication messages to enable/disable the lighting element 104, dim/brighten the lighting element 104, change the color of the lighting element 104, adjust the blink rate of the lighting element 104, and so on. In some embodiments, the central processor 106 may be configured to coordinate the light output of a plurality of lighting elements 104. Coordinating the light output of a plurality of lighting elements 104 may enable the generation of lighting patterns, including custom lighting patterns. Coordinating the light output of a plurality of lighting elements 104 may also enable the synchronization of lighting elements 104.

Utilizing a serial communication bus 107 to control and status the automotive lighting apparatuses 114 in a distributed automotive lighting system may increase the reliability and security of the automotive lighting system 100. For example, a serial communication protocol such as CAN may be used to transmit and receive serial communication messages. A serial communication protocol such as CAN may utilize security mechanisms to control the transmission of serial communication messages to and from the automotive lighting apparatus 114. In addition, a serial communication protocol such as CAN may utilize error detection and error handling mechanisms to ensure the transmission and reception of the serial communication messages.

Referring now to FIG. 2, an example automotive lighting apparatus 214 is provided. As depicted in FIG. 2, the example automotive lighting apparatus 214 includes a lighting element 204 and a lighting element driver 202 comprising a flexible circuit board 220. As further depicted in FIG. 2, a lighting element driver processor 222 is disposed on, and electrically connected to, the flexible circuit board 220. The lighting element driver 202 further includes an electrical connection port 224 disposed on the flexible circuit board 220 and providing an interface with, for example, a power supply line and a serial communication bus.

As depicted in FIG. 2, the electrical components of the lighting element driver 202 are positioned on a flexible circuit board 220. A flexible circuit board 220 is any circuit board that is manufactured using a flexible substrate, such as a flexible polymer material. For example, in some embodiments, the flexible circuit board 220 may comprise a polymide, such as Kapton. A flexible circuit board 220 may flex, twist, bend, fold, or otherwise deform and still maintain the electrical properties necessary to transmit electrical signals. In some embodiments, the flexible circuit board 220 may include conductive traces laminated on the surface of the flexible circuit board 220 to enable the transmission of electrical signals. The electrical components comprising the lighting element driver 202 may be attached to the flexible circuit board 220 using a paste, such as solder paste, a solder mask, vias or through holes, or other conductive fasteners.

As further depicted in FIG. 2, the electrical components comprising the lighting element driver 202 are mounted to, disposed on, or otherwise attached to the flexible circuit board 220. Such electrical components include the lighting element driver processor 222 and the electrical connection port 224. In addition, other electrical components necessary for the operation of the lighting element driver 202 are attached to the flexible circuit board 220 and electrically connected to other electrical components through the conductive traces of the flexible circuit board 220.

As depicted in FIG. 2, the flexible circuit board 220 comprises an electrical connection port 224. The electrical connection port 224 is any connector, mount, or other electrical mechanical device comprising conductive contact points enabling an electrical connection to be made between the flexible circuit board 220 and one or more conductive electrical channels (e.g., serial communication bus 107, power supply line 109). In some embodiments, the electrical connection port 224 includes a harness, port or other mechanism designed to slidably receive a compatible electrical connector. In such an embodiment, the electrical connection port 224 is designed to align the conductive contact points of the flexible circuit board with the corresponding transmission wires of the electrical connector. The electrical connection port 224 depicted in FIG. 2 facilitates the transmission and reception of serial communication messages on a serial communication bus according to a serial communication protocol. In addition, the electrical connection port 224 facilitates the transmission of power sufficient to illuminate the one or more lighting elements 204 electrically connected to the flexible circuit board 220. In some embodiments, the electrical connection port 224 disposed on the flexible circuit board 220 may support the transmission of serial communication messages in accordance with the CAN serial communication protocol. In some embodiments, the electrical connection port 224 may enable the reception of DC power of multiple magnitudes, for example, 1.8 volts, 3 volts, and/or 5 volts.

The flexible circuit board 220 further comprises the hardware and/or software necessary to implement a serial communication interface (e.g., serial communication interface 110) and a power supply interface (e.g., power supply interface 112) as described in relation to FIG. 1.

Utilizing a flexible circuit board 220 to implement the functionality of a lighting element driver 202 provides a number of advantages. A flexible circuit board 220 flexes, twists, folds, and deforms under the pressures of a harsh environment, for example, in an automobile. The flexibility provided by a flexible circuit board 220 improves the reliability of electrical components in a harsh environment. In contrast, a rigid circuit board, such as a printed circuit board comprising resin, glass, plastic, etc., may crack, break, or detach when used in a harsh environment. In addition, electrical components may detach from the printed circuit board due to the rigidity of the electrical connections.

A flexible circuit board 220 comprising all the electrical components of the lighting element driver 202 further removes the need for a rigid printed circuit board. Removing the rigid printed circuit board from the lighting element driver 202 reduces the space occupied by the automotive lighting apparatus 214. The reduction in space occupied by the automotive lighting apparatus 214 enables more automotive lighting apparatuses 214 to be installed in close proximity in a distributed automotive lighting system.

A flexible circuit board 220 may be manufactured having a thinner profile compared to a printed circuit board. For example, a flexible circuit board 220 may be between 0.25 and 1.0 millimeters thick; more preferably between 0.28 and 0.5 millimeters; most preferably between 0.29 and 0.4 millimeters thick. In addition, the flexible circuit board 220 may be stronger than a printed circuit board. Thus, a flexible circuit board 220 comprising all the electrical components of the lighting element driver 202 and eliminating the need for a printed circuit board enables a thinner, stronger lighting element driver 202 to be manufactured. A thinner and stronger lighting element driver 202 may better fit the small and complex installation space often available for an automotive lighting system.

A flexible circuit board 220 comprising all the electrical components of the lighting element driver 202 further reduces the manufacturing costs of an automotive lighting apparatus 214. Removing any rigid printed circuit boards in the automotive lighting apparatus 214 cuts down on manufacturing costs. In addition, an additional connector providing an electrical connection between a rigid printed circuit board and a flexible circuit board (e.g., PCB connector) is no longer necessary. Such PCB connectors may be difficult and expensive to manufacture. The reduction in cost to manufacture an automotive lighting apparatus 214 enables more automotive lighting apparatuses 214 to be installed in close proximity in a distributed automotive lighting system.

As further depicted in FIG. 2, the example automotive lighting apparatus 214 includes a lighting element 204. A lighting element 204 is any device, bulb, semiconductor, diode, laser, light emitting diode (LED), or other photon-emitting structure configured to output light. The lighting element 204 may be configured to output light at a specific wavelength or spectrum of wavelengths. The state (e.g., on/off), brightness, and/or color of the lighting element 204 may be controlled by the lighting element driver 202. In some embodiments, the state, brightness, and/or color may be configured through one or more serial communication messages transmitted on the serial communication bus and received at the lighting element driver 202. In some embodiments, the lighting element 204 may comprise a plurality or array of lighting segments 226. The state, brightness, and/or color of each lighting segment 226 of the plurality of lighting segments 226 may be configured by the lighting element driver 202 and/or by one or more serial communication messages.

As depicted in FIG. 2, the lighting element 204 is not mounted on the flexible circuit board 220 but is instead electrically connected to one or more external conductive contact points of the flexible circuit board 220. As such, the position of the lighting element 204 in the automotive lighting system may be fixed. Thus, the flexible circuit board 220 allows flexibility in the electrical connection while enabling the lighting element 204 to remain in a fixed position. Fixing the lighting element 204 in a position prevents the lighting elements 204 from shifting, moving, or otherwise dislodging, adding to the overall reliability of the automotive lighting system. In addition, mounting the lighting element 204 on a separate external structure enables better heat dissipation of the lighting element 204. Further, electrically connecting the lighting element 204 as opposed to mounting lighting elements 204 directly on the flexible circuit board 220 enable increased flexibility in the flexible circuit board 220. Otherwise, the lighting elements 204 may limit the flexibility of the flexible circuit board 220.

Figure 3:
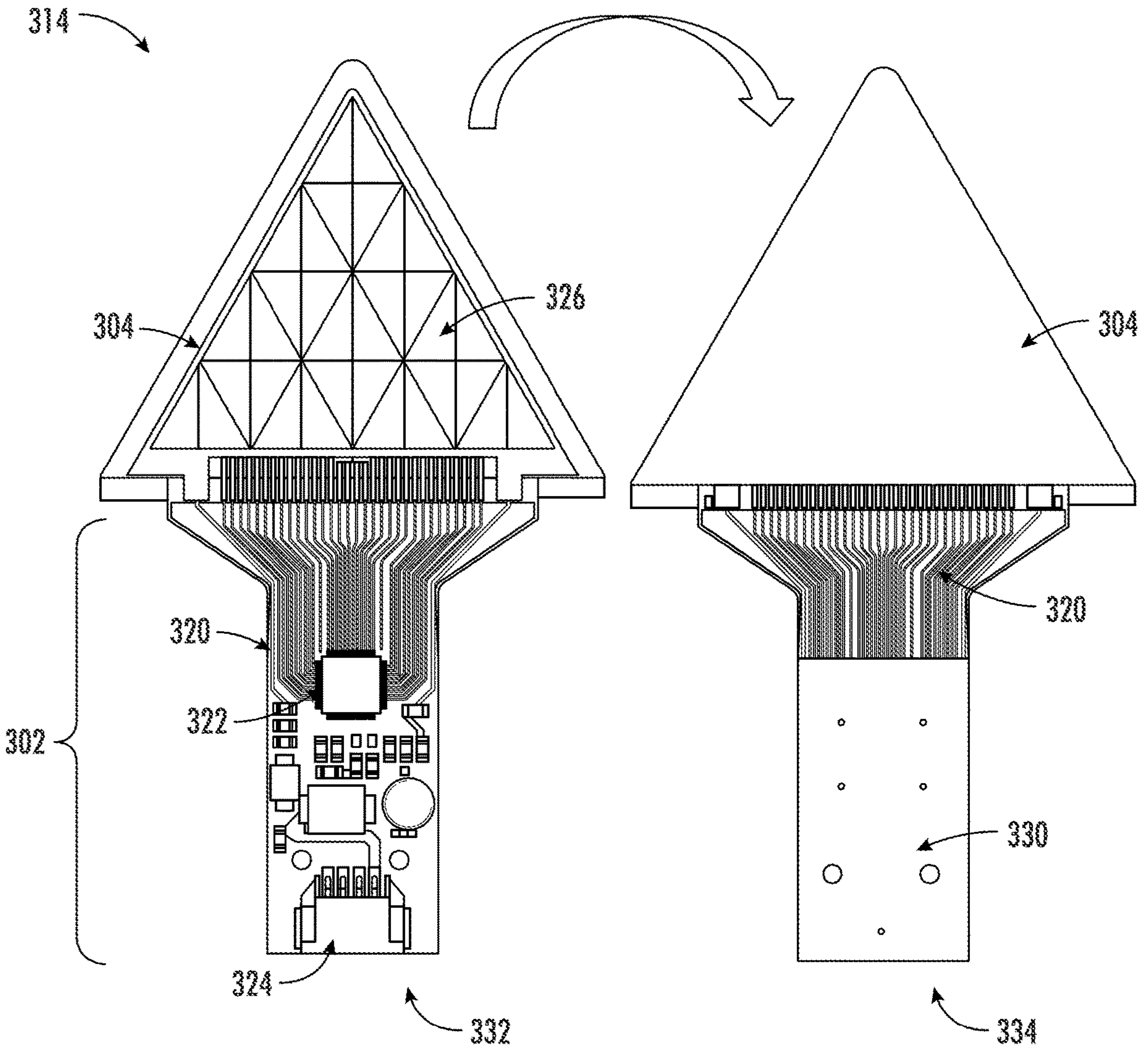
FIG. 3 illustrates a front and back view of an example automotive lighting apparatus comprising a rigid structure in accordance with an example embodiment of the present disclosure.

Referring now to FIG. 3, a front and back view of an example automotive lighting apparatus 314 is provided. As depicted in FIG. 3, the example automotive lighting apparatus 314 includes a lighting element 304 comprising a plurality of lighting segments 326 and a lighting element driver 302 comprising a flexible circuit board 320. As further depicted in FIG. 3, the flexible circuit board 220 includes a front surface 332 on which the electrical components comprising the lighting element driver 202 are attached, including a lighting element driver processor 322 and an electrical connection port 324. The depicted flexible circuit board 220 further includes a back surface 334 opposite the front surface 332. As depicted in FIG. 3, a rigid structure 330 is attached to the back surface 334 of the lighting element driver 302.

As depicted in FIG. 3, the example automotive lighting apparatus 314 includes a rigid structure 330 mounted to the back surface 334 of a portion of the flexible circuit board 320. The rigid structure 330 is any structure attached to a surface of the flexible circuit board 320 to provide stability to at least a portion of the flexible circuit board 320. For example, the rigid structure 330 may comprise steel, stainless steel, ceramic, graphite sheets, aluminum, copper, or another rigid material. The rigid structure 330 may provide a rigid surface and rigidity in a portion of the flexible circuit board 320, facilitating reliable electrical connections between the electrical components of the lighting element driver 302 and the flexible circuit board 320. The rigid structure 330 may be attached to the back surface 334 of the flexible circuit board 320 using an adhesive substance, pins, screws, staples, or other similar attaching mechanism.

In some embodiments, the rigid structure 330 may exhibit thermal conductivity properties enabling the dissipation of heat in the rigid structure 330. For example, the rigid structure 330 may improve heat dissipation from the electrical components mounted on the front surface 332 of the flexible circuit board 320 (e.g., lighting element driver processor 322, electrical connection port 324). In some embodiments, the rigid structure 330 may exhibit a high thermal conductivity. For example, in some embodiments, the thermal conductivity of the rigid structure 330 may be greater than 20 watts per meter-kelvin; more preferably greater than 30 watts per meter-kelvin; most preferably greater than 40 watts per meter-kelvin. By dissipating heat from the electrical components comprising the lighting element driver 302 mounted on the front surface 332 of the flexible circuit board 320, the performance and durability of the lighting element driver 302 may be greatly improved.

An automotive lighting apparatus 327 in accordance with the example embodiments described herein, may further be designed and manufactured in accordance with an automotive grade. Automotive grade may include any requirements and/or standards of any jurisdiction regarding the operational characteristics of any electrical component installed in an automobile, including parameters related to mechanical and electrical reliability, security, safety, and other compliance parameters. For example, some International Organization for Standardization (ISO) may include standards related to electromagnetic compatibility (EMC), such as long-term overvoltage standards, transient overvoltage standards, jump start standards, load dump standards, reset behavior, and so on. ISO EMC standards may further include mechanical validations, such as vibration test standards and mechanical shock standards. In addition, ISO EMC standards may further include climatic validation standards, such as high temperature and wet work validations, thermal shock standards, salt mist standards, and solar radiation standards. In addition, ISO EMC standards may further include certain validations, such as RE CISPR25 Class 5, CE CISPR25 Class 5, ISO 11452-2, ISO 11452-4, ISO 7637-2 Level III, ISO 7637-3, ISO 10605. The automotive light apparatus 327 may be designed and manufactured win accordance with one or more of these automotive grade standards.

Figure 4:
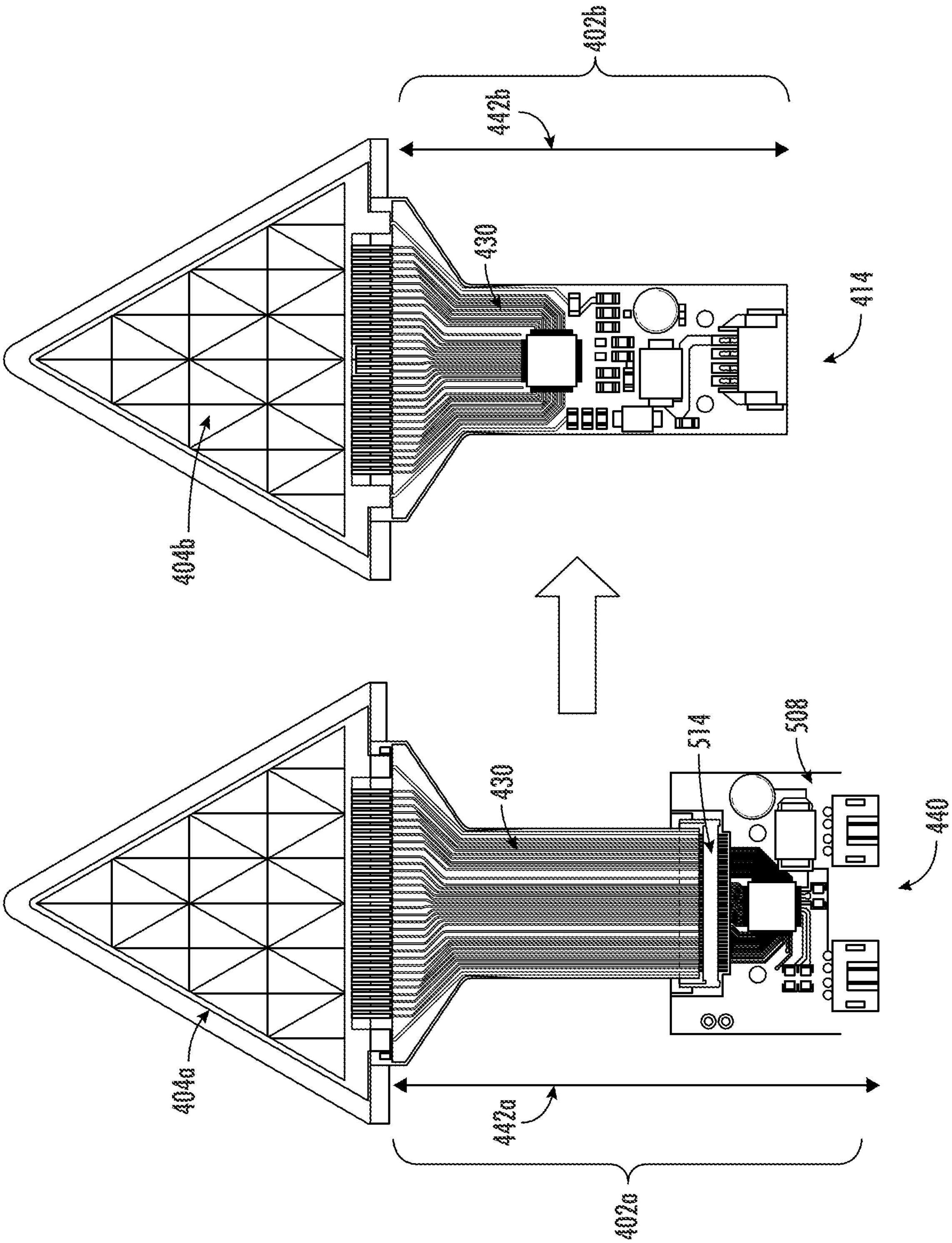
FIG. 4 illustrates a comparison between a previous example automotive lighting module and an automotive lighting apparatus in accordance with an example embodiment of the present disclosure.

Referring now to FIG. 4, a comparison between an automotive lighting module 440 including a lighting element driver 402*a* comprising a printed circuit board 508; and an automotive lighting apparatus 414 comprising a flexible circuit board 430 including the electrical components of the lighting element driver 402*b* is provided. As depicted in FIG. 4, the overall size of the lighting element driver 402*b* may be greatly reduced by mounting the electrical components of the lighting element driver 402*b* on the flexible circuit board 430 and removing the printed circuit board 508 and the PCB connector 514. For example, the lighting element driver length 442*b* of the lighting element driver 402*b* is reduced compared to the lighting element driver length 442*a* of the lighting element driver 402*a*. By reducing the overall size of the lighting element driver 402*b* compared to a lighting element driver 402*a* comprising a printed circuit board 508 and a PCB connector 514, the automotive lighting apparatuses 414 comprising an automotive lighting system may occupy less space. Thus, allowing more automotive lighting apparatuses 414 to be fit into a confined space. In addition, the complexity and cost of the manufacture of an automotive lighting apparatus 414 may be greatly reduced.

Figure 5:
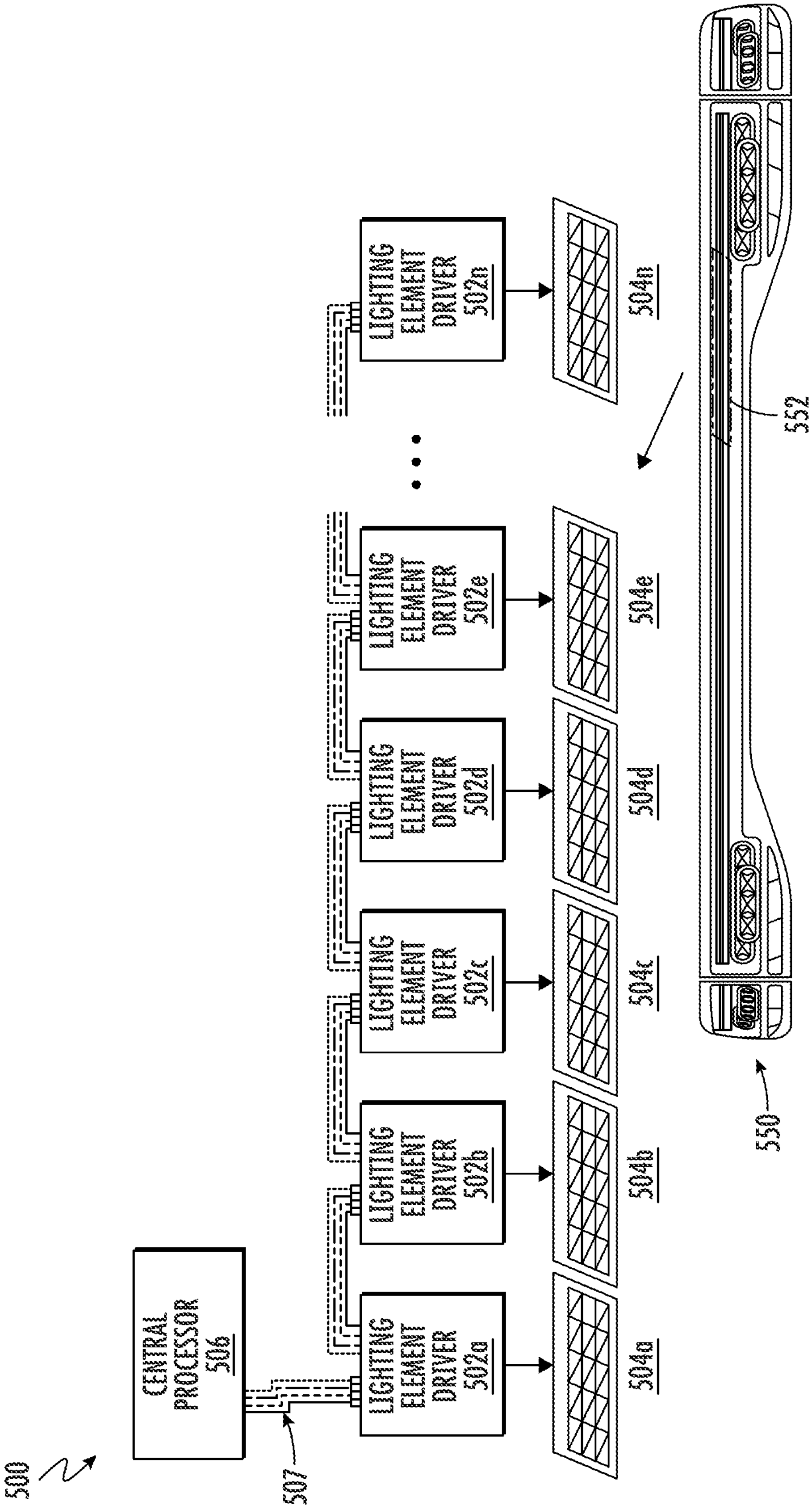
FIG. 5 illustrates an example automotive lighting system comprising a plurality of lighting apparatuses electrically connected in series in accordance with an example embodiment of the present disclosure.

Referring now to FIG. 5, an example automotive lighting system 500 is provided. As depicted in FIG. 5, the example automotive lighting system 500 includes a plurality of lighting element drivers 502*a*-502*n* electrically connected in series, and each configured to receive serial communication messages from a central processor 506 via a serial communication bus 507. As further depicted in FIG. 5, each lighting element driver 502*a*-502*n* is electrically connected to a lighting element 504*a*-504*n*. The plurality of lighting elements 504*a*-504*n* are arranged to form a lighting portion 552 of an automotive lighting feature 550.

As depicted in FIG. 5, the plurality of lighting elements 504*a*-504*n* may be arranged to form a lighting portion 552 of an automotive lighting feature 550. An automotive lighting feature 550 is any feature of an automobile equipped with one or more lighting elements (e.g., lighting element 504*a*-504*n*) and configured to generate light as part of the operation of the automobile. Although depicted as an automotive lighting feature 550 external to an automobile, the automotive lighting feature 550 may be disposed at any location in or on an automobile. For example, an automotive lighting feature 550, may include brake lights, tail lights, reverse lights, running lights, sidelights, turn indicator lights, parking lights, any internal or external aesthetic lights, headlights, fog lights, low beam lights, high beam lights, daytime running lights, hazard lights, interior ambient lights, dashboard lights, heads-up display lights, dash indicator lights, and/or any other lighting system in or on an automobile.

As further depicted in FIG. 5, the example automotive lighting feature 550 may comprise a plurality of lighting elements 504*a*-504*n*, each comprising an associated lighting element driver 502*a*-502*n*, wherein each lighting element driver 502*a*-502*n* is electrically connected in series by a serial communication bus 507. In some embodiments, serial communication messages transmitted on the serial communication bus 507 may be relayed between lighting element drivers 502*a*-502*n*. As described herein, the lighting element driver 502*a*-502*n* may be configured to recognize serial communication messages and accept, reject, and/or relay serial communication messages based on a destination identifier.

As further depicted in FIG. 5, by arranging lighting elements 504*a*-504*n* in fixed patterns on an automobile surface and attaching the associated lighting element driver 502*a*-502*n* to a central processor 506, the lighting elements 504*a*-504*n* may be programmed to act in coordination. The central processor 506 may coordinate control of certain aspects of each lighting element 504*a*-504*n* in a plurality of lighting elements 504*a*-504*n*, such as state, color, and/or brightness, to indicate messages, display a pattern, display information, provide ambient light, improve the lighting aesthetics of an automobile, or otherwise pattern the output of lighting elements 504*a*-504*n*. For example, the lighting elements 504*a*-504*n* operated in coordination may indicate an automobile is slowing down, stopping, stopped, stopping quickly, or any other indication of a change in speed. The lighting elements 504*a*-504*n* may operate in a coordinated pattern to indicate an automobile driver's intention to turn. In some embodiments, the lighting elements 504*a*-504*n* may display custom and/or pre-configured light patterns to indicate such messages, display information, and/or provide aesthetics through the lighting elements 504*a*-504*n*.

Figure 6:
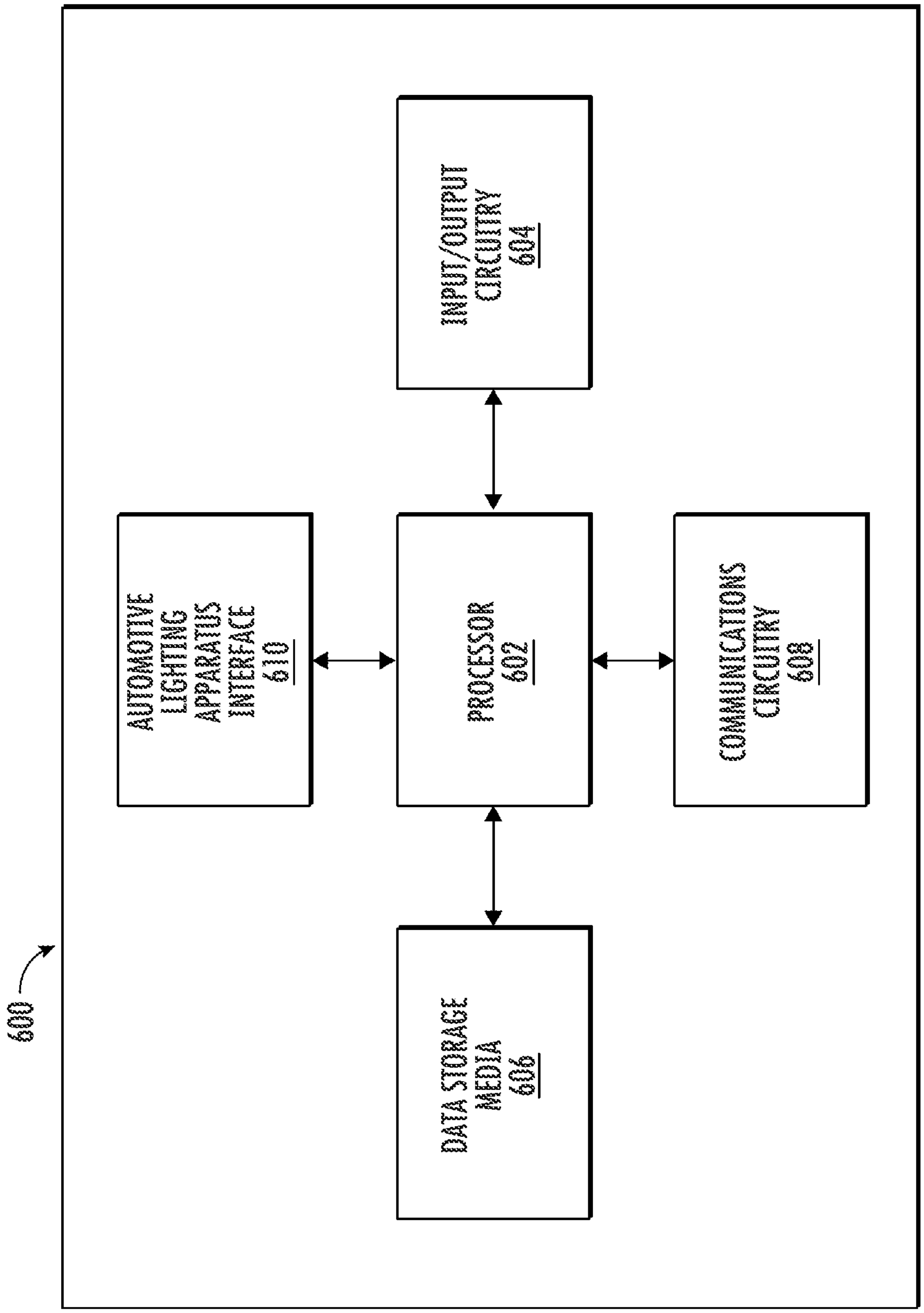
FIG. 6 illustrates an example block diagram of a central processor in accordance with an example embodiment of the present disclosure.

Example components of a central processor 506 are described in relation to FIG. 6.

Referring now to FIG. 6, an example apparatus 600 is provided. A central processor (e.g., central processor 106, central processor 506) may be embodied by one or more computing systems such as apparatus 600 shown in FIG. 6. The example apparatus 600 includes processor 602, input/output circuitry 604, data storage media 606, communications circuitry 608, and automotive lighting apparatus interface 610. In some embodiments, the apparatus 600 is configured, using one or more of the sets of circuitry 602, 604, 606, 608, and/or 610, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the apparatus 600 provide or supplement the functionality of other particular sets of circuitry. For example, the processor 602 in some embodiments provides processing functionality to any of the sets of circuitry, the data storage media 606 provides storage functionality to any of the sets of circuitry, the communications circuitry 608 provides network interface functionality to any of the sets of circuitry, and/or the like.

In some embodiments, the processor 602 (and/or co-processor or any other processing circuitry assisting or otherwise associated with the processor) is/are in communication with the data storage media 606 via a bus for passing information among components of the apparatus 600. In some embodiments, for example, the data storage media 606 is non-transitory and may include, for example, one or more volatile and/or non-volatile memories. In other words, for example, the data storage media 606 in some embodiments includes or embodies an electronic storage device (e.g., a computer readable storage medium). In some embodiments, the data storage media 606 is configured to store information, data, content, applications, instructions, or the like, for enabling the apparatus 600 to carry out various functions in accordance with example embodiments of the present disclosure.

The processor 602 may be embodied in a number of different ways. For example, in some example embodiments, the processor 602 includes one or more processing devices configured to perform independently. Additionally, or alternatively, in some embodiments, the processor 602 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 600, and/or one or more remote or "cloud" processor(s) external to the apparatus 600.

In an example embodiment, the processor 602 is configured to execute instructions stored in the data storage media 606 or otherwise accessible to the processor. Alternatively, or additionally, the processor 602 in some embodiments is configured to execute hard-coded functionality. As such, whether configured by hardware or software methods, or by a combination thereof, the processor 602 represents an entity (e.g., physically embodied in circuitry) capable of performing operations according to an embodiment of the present disclosure while configured accordingly. Alternatively, or additionally, as another example in some example embodiments, when the processor 602 is embodied as an executor of software instructions, the instructions specifically configure the processor 602 to perform the algorithms embodied in the specific operations described herein when such instructions are executed.

As one particular example embodiment, the processor 602 is configured to perform various operations associated with controlling the state (e.g., on/off), brightness, and/or color of the lighting elements (e.g., lighting elements 104, 204, 304, 404, 504) in a plurality of lighting elements to indicate messages, display a pattern, display information, provide ambient light, improve the lighting aesthetics of an automobile, or otherwise pattern the output of the lighting elements.

In some embodiments, the apparatus 600 includes input/output circuitry 604 that provides output to the user and, in some embodiments, to receive an indication of a user input. In some embodiments, the input/output circuitry 604 is in communication with the processor 602 to provide such functionality. The input/output circuitry 604 may comprise one or more user interface(s) (e.g., user interface) and in some embodiments includes a display that comprises the interface(s) rendered as a web user interface, an application user interface, a user device, a backend system, or the like. The processor 602 and/or input/output circuitry 604 comprising the processor may be configured to control one or more functions of one or more user interface elements through computer program instructions (e.g., software and/or firmware) stored on a memory accessible to the processor (e.g., data storage media 606, and/or the like). In some embodiments, the input/output circuitry 604 includes or utilizes a user-facing application to provide input/output functionality to a client device and/or other display associated with a user.

In some embodiments, the apparatus 600 includes communications circuitry 608. The communications circuitry 608 includes any means such as a device or circuitry embodied in either hardware or a combination of hardware and software that is configured to receive and/or transmit data from/to a network and/or any other device, circuitry, or module in communication with the apparatus 600. In this regard, the communications circuitry 608 includes, for example in some embodiments, a network interface for enabling communications with a wired or wireless communications network. Additionally, or alternatively in some embodiments, the communications circuitry 608 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 608 includes circuitry for interacting with the antenna(s) and/or other hardware or software to cause transmission of signals via the antenna(s) or to handle receipt of signals received via the antenna(s). In some embodiments, the communications circuitry 608 enables transmission to and/or receipt of data from a client device in communication with the apparatus 600.

The automotive lighting apparatus interface 610 includes hardware, software, firmware, and/or a combination thereof, that supports various functionality associated with configuring and/or communicating with one or more lighting element drivers (e.g., lighting element driver 102, 202, 302, 402, 502). For example, in some embodiments, the automotive lighting apparatus interface 610 may include various circuitry to transmit serial communication messages to the lighting element drivers and receive serial communication messages from the various lighting element drivers. In some embodiments, the automotive lighting apparatus interface 610 may be configured to generate and decode messages in compliance with the CAN serial communication protocol. In some embodiments, the automotive lighting apparatus interface 610 may be configured to enable the transmission of power associated with the control of the one or more lighting element drivers. For example, the automotive lighting apparatus interface 610 may enable the transmission of DC power to the lighting element drivers, including, the transmission of DC power comprising multiple magnitudes, such as, 1.8 volts, 3 volts, and/or 5 volts.

Additionally, or alternatively, in some embodiments, one or more of the sets of circuitry 602-610 are combinable. Additionally, or alternatively, in some embodiments, one or more of the sets of circuitry perform some or all of the functionality described associated with another component. For example, in some embodiments, one or more sets of circuitry 602-610 are combined into a single module embodied in hardware, software, firmware, and/or a combination thereof. Similarly, in some embodiments, one or more of the sets of circuitry, for example automotive lighting apparatus interface 610, is/are combined such that the processor 602 performs one or more of the operations described above with respect to each of these circuitry individually.

Automotive lighting systems utilizing one or more of the herein described embodiments to implement the functionality of a lighting element driver on a flexible circuit board may eliminate the need for bulky lighting element drivers comprising printed circuit boards, associated wiring, and additional electrical connectors, thus reducing the overall size and cost of an automotive lighting apparatus comprising a lighting element driver and a lighting element. The reduction in overall size and cost may enable a higher density of lighting elements in an automotive lighting feature improving the overall functionality and safety of an automotive lighting feature. In addition, removing the printed circuit board and associated PCB connector, coupled with control via a secure serial communication protocol improves the overall reliability and security of the electrical connections to the automotive lighting features, further improving the safety and reliability of the automobile. In addition, unique lighting patterns of the lighting elements within an automotive lighting feature may increase the possible lighting patterns and thus the amount and quality of information conveyed through an automotive lighting feature.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes a lighting element driver to receive power from a power source and serial communication messages related to the light output of a lighting element to determine the power output to one or more lighting segments of the lighting element. For example, a lighting element driver in any distributed lighting system configured to coordinate the control of multiple lighting elements through a central processor, such as lighting displays, any motor vehicles, including cars, trucks, vans, all-terrain vehicles, boats, and so on.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
a lighting element; and
a lighting element driver electrically connected to the lighting element and a serial communication bus, the lighting element driver comprising:
a flexible circuit board;
a serial communication interface configured to receive a serial communication message related to the lighting element,
a power supply interface electrically connected to a power source; and
a lighting element driver processor mounted on and electrically connected to the flexible circuit board,
wherein the lighting element driver transmits power from the power supply interface to the lighting element based at least in part on the serial communication message.

2. The apparatus of claim 1, further comprising:
a rigid structure attached to a portion of the flexible circuit board,
wherein the lighting element driver processor is mounted on a first surface of the flexible circuit board, and
wherein the rigid structure is mounted on a second surface of the flexible circuit board opposite the first surface.

3. The apparatus of claim 2, wherein the rigid structure has a thermal conductivity greater than 20 watts per meter-kelvin.

4. The apparatus of claim 2, wherein the rigid structure comprises steel.

5. The apparatus of claim 1, further comprising an electrical connection port configured to receive an electrical connector.

6. The apparatus of claim 5, wherein the electrical connection port is configured to connect to the serial communication bus and a power supply line providing power from the power source.

7. The apparatus of claim 1, wherein the lighting element comprises a plurality of lighting segments.

8. The apparatus of claim 7, wherein the lighting segments are individually enabled by the lighting element driver processor.

9. The apparatus of claim 1, wherein the lighting element is a light emitting diode.

10. The apparatus of claim 1, wherein the serial communication interface is configured to receive the serial communication message in accordance with a controller area network (CAN) serial communication protocol.

11. The apparatus of claim 1, wherein the lighting element driver is manufactured in accordance with an automotive grade.

12. An automotive lighting system, comprising:
a central processor; and
a plurality of lighting apparatuses, each lighting apparatus comprising:
a lighting element; and
a lighting element driver electrically connected to the lighting element and a serial communication bus, the lighting element driver comprising:
a flexible circuit board;
a serial communication interface configured to receive a serial communication message related to the lighting element,
a power supply interface electrically connected to a power source; and
a lighting element driver processor mounted on and electrically connected to the flexible circuit board,
wherein the lighting element driver transmits power from the power supply interface to one or more light segments of the lighting element based at least in part on the serial communication message.

13. The automotive lighting system of claim 12, wherein the plurality of lighting apparatuses are electrically connected in series.

14. The automotive lighting system of claim 12, further comprising:
a rigid structure attached to a portion of the flexible circuit board;
wherein the lighting element driver processor is mounted on a first surface of the flexible circuit board, and
wherein the rigid structure is mounted on a second surface of the flexible circuit board opposite the first surface.

15. The automotive lighting system of claim 14, wherein the rigid structure comprises steel.

16. The automotive lighting system of claim 12, further comprising an electrical connection port configured to receive an electrical connector, wherein the electrical connection port is configured to connect to the serial communication bus and a power supply line providing power from the power source.

17. The automotive lighting system of claim 12, wherein the lighting element is a light emitting diode.

18. The automotive lighting system of claim 12, wherein the serial communication interface is configured to receive the serial communication message in accordance with a controller area network (CAN) serial communication protocol.

19. An automotive lighting apparatus comprising:
a lighting element; and
a lighting element driver electrically connected to the lighting element and a serial communication bus, the lighting element driver comprising:
a flexible circuit board;
a serial communication interface mounted on and electrically connected to the flexible circuit board and configured to receive a serial communication message; and
a lighting element driver processor mounted on and electrically connected to the flexible circuit board,
wherein the lighting element driver enables one or more light segments of the lighting element based at least in part on the serial communication message; and
a rigid structure attached to a portion of the flexible circuit board,
wherein the lighting element driver processor is mounted on a first surface of the flexible circuit board, and
wherein the rigid structure is mounted on a second surface of the flexible circuit board opposite the first surface.

20. The automotive lighting apparatus of claim 19, further comprising an electrical connection port configured to receive an electrical connector, wherein the electrical connection port is configured to connect to the serial communication bus and a power supply line providing power from a power source.

* * * * *